May 20, 1969 V. W. WESTDALE 3,445,670
PHOTOELECTRIC METHOD FOR TESTING THE LIFE
AND QUALITY OF INKED RIBBONS
Filed Aug. 12, 1965
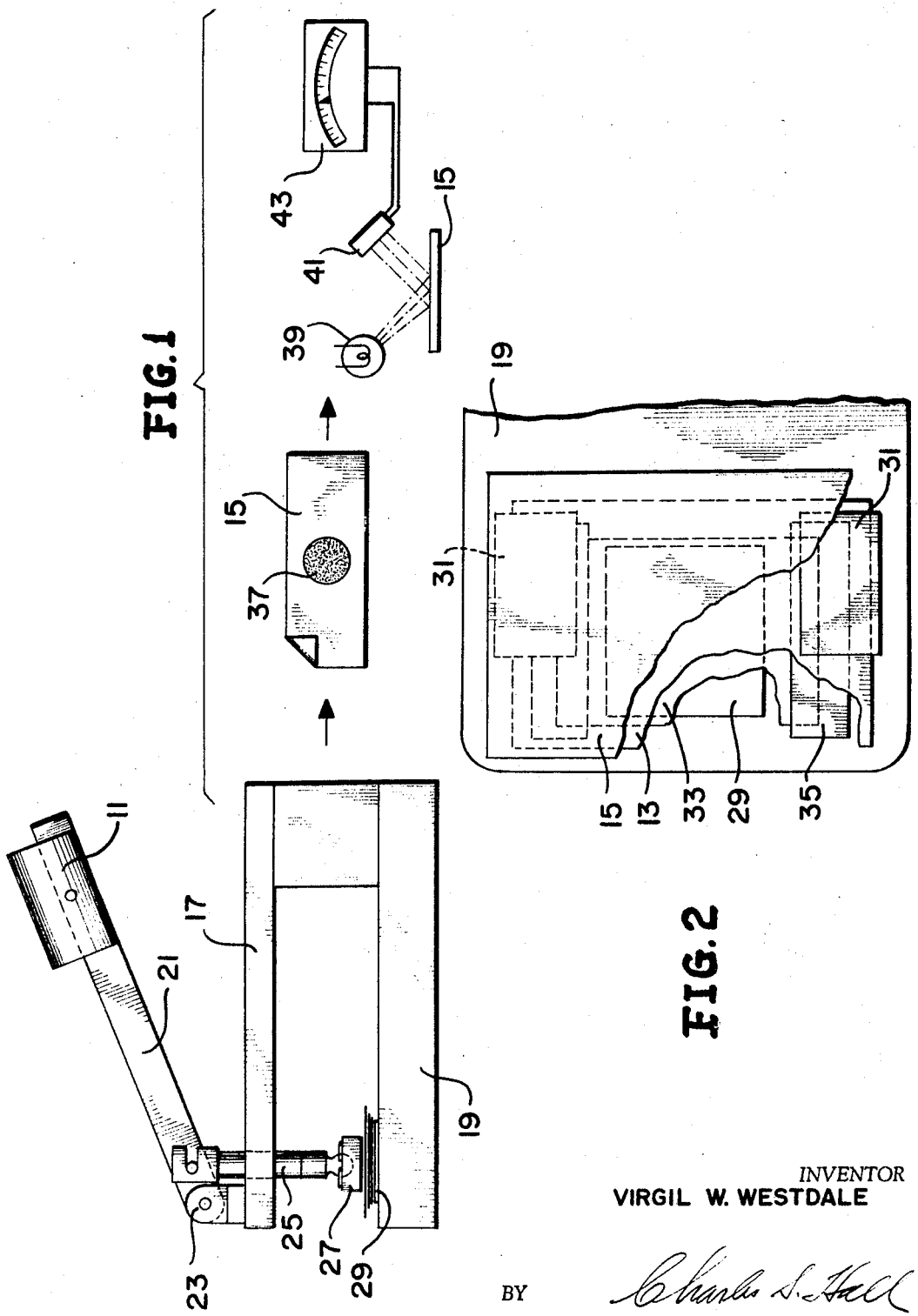
INVENTOR
VIRGIL W. WESTDALE
BY *Charles S. Hall*
ATTORNEY

3,445,670
PHOTOELECTRIC METHOD FOR TESTING THE LIFE AND QUALITY OF INKED RIBBONS
Virgil W. Westdale, Farmington, Mich., assignor to Burroughs Corporation, Detroit, Mich., a corporation of Michigan
Filed Aug. 12, 1965, Ser. No. 479,209
Int. Cl. G01n 21/30
U.S. Cl. 250—219                                              6 Claims

ABSTRACT OF THE DISCLOSURE

The quality of newly inked printing ribbons is determined by transferring an image from said ribbon to a test sheet. The image is then photoelectrically analyzed so as to determine its contrast value in terms of a meter reading and the value is then compared with predetermined standard readings to predict the potential life of the ribbon.

---

The present invention relates to a method for testing the quality of materials used as transfer media in printing apparatus. More particularly, the invention relates to an improved method of predicting the life and printability of inked typewriter ribbons, carbon paper and the like.

In the manufacture and use of inked ribbons, it is desirable to be able to determine their life and printability. Some inks will leave the cloth very fast upon use, thus making the initial prints very dark. Other inks leave the cloth evenly during printing operations, thus making the print more uniform throughout, and often extending the life of the ribbon.

One known method of testing an inked ribbon or other transfer material is by impact in which a ribbon, for example, is subjected to repeated blows of a type member. Ribbon quality is generally interpreted in terms of the number of legible impressions made before the ribbon is destroyed. The chief disadvantage of this method is its destructive nature, which makes its use economically unsound in testing large expensive ribbons such as those used in drum printers which may be, for example, 17 inches wide. Also, it is inherently time-consuming and is relatively inaccurate due to the qualitative nature of the results obtained.

Another known method is to photoelectrically analyze the shade or coloring of a liquid impregnated sample and to use this analysis in interpreting its quality. This method can be rapid and can provide a quantitative evaluation of a sample in terms of an electrical meter reading. However, in the testing of inked ribbons, this method does not simulate actual ribbon usage in that the evaluation is based only on the shade of the ribbon and not on the condition of a transfer image.

Both of the foregoing methods have an additional disadvantage in that they are unsatisfactory for testing newly inked ribbons in which the ink has not yet dried. When ribbons are handled in great quantities, it may be desirable to quality test a few ribbons taken as samples from a large shipment. Also, in the case of the big and expensive drum printer ribbons mentioned previously, each new ribbon may be subjected to a quality test. Oftentimes these new ribbons are wrapped in air-tight aluminum foil or cellophane packages immediately after manufacture so that the ink-carrying solvent in the ribbon has not had a chance to evaporate before testing. The irregularity with which the solvents evaporate, coupled with the lack of suitable control in heretofore known impact and color-variation ribbon test methods, has therefore prohibited the use of these methods for quality testing newly inked ribbons where a high degree of accuracy is required.

Accordingly, it is the principal object of the invention to provide a non-destructive, rapid, and easy-to-perform method of predicting ribbon life and printability.

A further object of the present invention is to provide a ribbon test method for accurately and consistently determining the quality of newly-inked ribbons in which the ink-carrying solvent has not yet evaporated.

It is another object of the invention to provide a ribbon test method which accurately and consistently indicates ribbon life and printability in terms of a single numerical reading obtained from an electrical output meter.

In accordance with the foregoing objects, applicant's method of testing transfer medium quality comprises the steps of transferring an image from the transfer medium to a test sheet under controlled pressure and time, measuring the contrast of the resulting transfer spot on the test sheet by photoelectric means giving an output in terms of a meter reading, and comparing the meter reading with predetermined standard readings correlated to ribbon quality.

Other objects and features of the invention will be specifically pointed out or will become apparent when referring to the following description taken in conjunction with the accompanying drawings in which:

FIG. 1 is a diagrammatic representation of applying the method including a side view of apparatus utilizable therein.

FIG. 2 is a fragmentary view of the base plate and pressure surface of the press shown in FIG. 1.

In the first step of applicant's method of testing transfer medium quality, a ribbon, for example, to be tested is positioned in contact with a test sheet which may be a piece of paper of the commercially standard, controlled whiteness variety. Only a small test area is required, and this area is not destroyed. Therefore, the test area need be only a small portion of a large ribbon to be quality tested before use. After positioning the ribbon and the paper, a constant pressure is applied to the combination so as to transfer ink from the ribbon to the paper.

One type of apparatus for transferring ink from a ribbon under test is basically a press as shown in FIG. 1, in which the gravitational force of a weight 11 causes compression of the test ribbon 13, as shown in FIG. 2, against the standard whiteness transfer paper 15. A supporting beam 17 disposed above a metal base plate 19 carries a pivotably mounted lever arm 21 having the weight 11 attached to its end farthest from its fulcrum 23. When activated, a pressure rod 25 pivotably connected to a point of the lever arm 21 close to the fulcrum 23 transmits the amplified force of the weight 11 downward through a pressure foot 27 and onto a pad 29 secured to the base plate 19. The pad 29 is preferably made of a durable, semi-resilient, ink resistant material such as neoprene rubber. The ribbon 13 is held flat against the pad 29 by magnets 31 or other suitable fastening means on the metal base plate 19, as shown in FIG. 2. To insure accurate test results, the ribbon 13 must lie flat and unwrinkled against the pad 29. A sheet of aluminum foil 33 or other liquid impervious sheet may be placed between the test ribbon 13 and the pad 29 to keep the pad devoid of residual ink which may distort test results. The aluminum foil 33 is held in place by strips of tape 35.

It will be understood that the press shown in FIG. 1 is purely exemplary, and that any other device for transferring an image from the transfer medium to a test sheet under controlled conditions of pressure and time can be used to carry out applicant's process.

Several examples will serve to illustrate how accurate test results are obtained. The value of the applied pressure and its dwell time on the ribbon are carefully controlled. In one application of the invention, satisfactory results were obtained with a pressure of 16 pounds having a dwell time of two minutes. In a second application, a larger pressure of 62 pounds was used with a shorter dwell time of 20 seconds. For a given ribbon sample, test results in these two cases have been found to correlate with each other within 98%. The controlled whiteness transfer paper used may be any commercially available type. In the cited examples, paper was used having the trade name Stanopaque.

The applied pressure imparts to the paper 15 a transfer spot 37 whose density is proportional to the magnitude of the pressure and its dwell time. The single impression created is sufficient for performance of the test. No multiple impacts are required, and there is no damaging stress on the ribbon sample.

Following the creation of the transfer spot 37, its contrast on the standard-whiteness paper 15 is measured by photoelectric analysis. This is indicated diagrammatically in FIG. 1 by the photometer comprising the combination of the lamp 39, photocell 41, and output meter 43. In the preferred application of the method, the apparatus used is a commercially available photometer having an output meter with a graduated scale. However, performance of the method need not be limited to commercial equipment, and satisfactory results may be achieved by using any properly calibrated photosensitive transducing means.

The photometer is first calibrated by measuring the reflected light from an unmarked part of the standard-whiteness transfer paper 15 and setting the meter to read some standard value such as "100." Then the transfer spot 37 is measured and the resulting meter reading is recorded as an indication of the relative contrast of the spot. This in turn indicates the amount of ink transferred from the ribbon and enables prediction of ribbon wear-down and print legibility performance.

The last step is to compare the meter reading obtained for a given test ribbon with standard readings which have been previously derived. A large number of ribbon tests were conducted and meter readings for the resulting transfer spots were obtained. Each test ribbon was then subjected to actual use and its weardown and print legibility performance were correlated with its corresponding meter reading taken before actual use. The range of readings thus obtained are used in subsequent tests to predict ribbon life by comparing the numerical value of the transfer spot contrast with a corresponding standard of ribbon performance. Actual ribbon performance has been found to correlate well with predicted performance.

It has been found that the viscosity of the ink in a test ribbon may be affected by ambient temperature changes, thus influencing test results. In order to prevent undesirable inconsistencies in transfer spot density and thus to insure accurate test results, it may be advisable to maintain ambient temperature constant. For example, satisfactory results have been obtained through the consistent use of an atmosphere of 73 degrees Fahrenheit in conducting the tests.

While in this description only the preferred application of the method has been described, it should be noted that the scope of the invention does not exclude various changes and modifications that are within the skill of those familiar with the art.

What is claimed is:

1. A method of predicting the life and quality of a transfer medium of the type used in impact printing devices, comprising the steps of:
    transferring by a single impact an image from said transfer medium to a test sheet under controlled conditions of pressure and time,
    photoelectrically measuring the contrast of said image on said test sheet, and
    comparing said transfer image contrast with predetermined standards of contrast correlated to the life and quality of said transfer medium.

2. A non-destructive and rapid method for testing the life and quality of inked ribbons comprising the steps of:
    positioning a test sheet having known optical characteristics in contact with an inked ribbon,
    applying to the combination of said test sheet and said ribbon a controlled non-destructive pressure for a predetermined time to create a transfer image on said test sheet,
    photoelectrically analyzing said transfer image so as to determine its contrast in terms of a single numerical value,
    comparing said contrast value with predetermined standard readings corresponding to varying degrees of ribbon wear-down and print legibility performance, and
    predicting the potential life of said transfer medium on the basis of the comparison of said transfer image contrast value with said predetermined standard readings.

3. A non-destructive and rapid method of using a single meter reading to predict the wear-down and print legibility performance of an inked ribbon comprising:
    positioning a paper of standard controlled whiteness in intimate contact with an inked ribbon,
    applying to the combination of said paper and said ribbon a constant non-destructive pressure for a predetermined time to create a transfer spot on said paper,
    photoelectrically analyzing said transfer spot to obtain its contrast value in terms of a single meter reading,
    comparing said contrast value with predetermined standard photometer readings corresponding to varying degrees of ribbon wear-down and print legibility performance, and
    predicting potential ribbon life and quality by correlating said contrast value of said ribbon with said predetermined standard photometer readings.

4. The method of claim 1 wherein said single impact is non-damaging to said transfer medium.

5. The method of claim 2 wherein said controlled non-destructive pressure is applied by a single impact.

6. The method of claim 3 wherein said constant non-destructive pressure is applied by a single impact.

References Cited

UNITED STATES PATENTS

| | | | |
|---|---|---|---|
| 1,738,830 | 12/1929 | Kanixewisher | 73—14 X |
| 2,560,010 | 7/1951 | Strobosch | 73—14 |
| 2,951,164 | 8/1960 | Timms | 250—219 |
| 3,289,581 | 12/1966 | Roozee | 88—14 X |

WALTER STOLWEIN, Primary Examiner.

U.S. Cl. X.R.

73—14